UNITED STATES PATENT OFFICE.

HENRY V. DUNHAM, OF MOUNT VERNON, NEW YORK.

DRIED SOLUBLE KARAYA-GUM COMPOSITION AND PROCESS OF MAKING.

1,334,357.  Specification of Letters Patent. Patented Mar. 23, 1920.

No Drawing.  Application filed November 26, 1919. Serial No. 340,880.

*To all whom it may concern:*

Be it known that I, HENRY V. DUNHAM, a citizen of the United States, residing at Mount Vernon, in the county of Westchester and State of New York, have invented certain new and useful Improvements in Dried Soluble Karaya-Gum Compositions and Processes of Making, of which the following is a specification.

The present invention relates to the production of a dried karaya gum composition which contains solubilized karaya gum, so that when the dried product is added to water or aqueous liquids, the said gum will dissolve.

Karaya gum is a known material, but heretofore it has not been extensively used, so far as I have been advised, on account of the fact that it is by itself insoluble in water. When placed in water, either in the form of large or small pieces, or even pulverized to an almost impalpable powder, the pieces or particles of the gum will absorb a large amount of water, and will swell greatly, but do not dissolve. I have found that if a small amount of alkali, for example, sodium carbonate or sodium bicarbonate, is added to the water in which the gum is to be soaked, or if the gum is first soaked in water and subsequently an alkali is added, then the gum itself will dissolve. The gum contains a small amount of acid substances which, when they are acted upon with an alkali, not only do the acid substances themselves become water-soluble, but the entire material, namely, the gum, also dissolves, and there is thereby produced a solution of the alkali metal compounds of the acid substances, containing the gum itself (apparently without any chemical change) in solution. Karaya gum is produced from the following: *Sterculia urens* Roxb., *S. vilosa* Roxb., *S. tragacantha* Lind., *Cochlospermum gossypium* D. C. and from other related species of *Sterculia* and *Cochlospermum*. This gum is imported from India and the different varieties vary more or less in acidity. The material is much cheaper than gum tragacanth, but cannot ordinarily be substituted for the latter in adhesives or in compositions for other purposes for which gum tragacanth is employed on account of its insolubility in water. I have found it possible to readily dissolve the gum by the addition of a small amount of an alkali, say, sodium carbonate, for example, from 2 or 3% with some samples up to 6 or 8% with other samples. The solution of the gum in water containing a little soda is sometimes alkaline and sometimes neutral, depending upon the amount of alkali used. The gum with the alkali added can readily be dissolved in from 50 to 500 parts of water, and the solutions produced are very viscous and thick, even when 500 parts of water to 1 part of gum are employed. If it is desired to produce a neutral solution of the gum (*i. e.* a solution neutral to litmus paper), then it is advisable to employ a sufficient amount of alkali to first produce a solution containing a small excess of alkali so that the liquid is alkaline to litmus and to then add a small amount of a mineral or organic acid sufficient to neutralize the excess acid. It is, of course, to be understood that sodium carbonate is not the only alkali which can be conveniently employed, sodium bicarbonate or potassium carbonate or bicarbonate can be used equally as well. Caustic alkalis can be used in some cases, but any considerable excess of caustic alkali is liable to produce injury, particularly if the liquid is strongly heated. When sodium carbonate or bicarbonate is used, it is in many cases advisable to heat the liquid somewhat in order to cause the gum to dissolve more quickly.

After the gum has been dissolved, for example, by any of the processes above referred to, or any other suitable process, I preferably add milk or a liquid more or less similar to milk. Skimmed milk is, for many purposes, a suitable addition. Milk substitutes or "artificial milk" or various forms of modified milk can likewise be used. If the milk or milk product is considerably acid in reaction, then it is advisable to employ the karaya gum solution in a somewhat alkaline state or else to neutralize the acidity of the milk or milk product before adding the same to the alkalized karaya gum solution. Obviously milk which has been concentrated to any desired extent can be likewise employed. The resulting liquid, namely, the solution containing, for example, karaya gum dissolved in alkali, and skimmed milk is then dried in any suitable manner, for example, on a Just milk drier. The proportions of gum and milk may be varied considerably, depending upon the particular use to which the product is to be put. Thus, with one pound of karaya gum I may use in some instances 10 to 20 pounds of ordinary skimmed milk or an equivalent quantity of concentrated skimmed milk.

The dried product can be mixed with water in the same manner as dried milk is mixed with water and produces a perfect mixture or emulsion, the gum going into solution. The product can be used for very many purposes, for example, it may be used as a thickener for distemper paints, calcimine compositions and the like, or it may be used as an ingredient of food compounds, for example, in certain lines of baking, in the manufacture of confectionery, in the manufacture of ice cream and for various other purposes. The solution of the gum in water is substantially tasteless, and is noninjurious to the human digestive system and hence the product can be used for thickening various edible products.

It is to be understood that other materials suitable for the purposes for which the product is intended can be added at any stage of the process. Thus, for instance, sugar, flavoring material and the like may be added prior to the drying operation.

I claim:

1. A dried mixture of a lacteal fluid and solubilized karaya gum.

2. A dried mixture of a skimmed milk and solubilized karaya gum.

3. A process which comprises acting on karaya gum with an alkali and drying a mixture of the alkali-karaya-gum compound and a milk product.

4. A process which comprises soaking karaya gum in water in the presence of a small amount of a mild alkali, adding a lacteal fluid and drying the mixture.

In testimony whereof I have affixed my signature.

HENRY V. DUNHAM.